Figure 1:
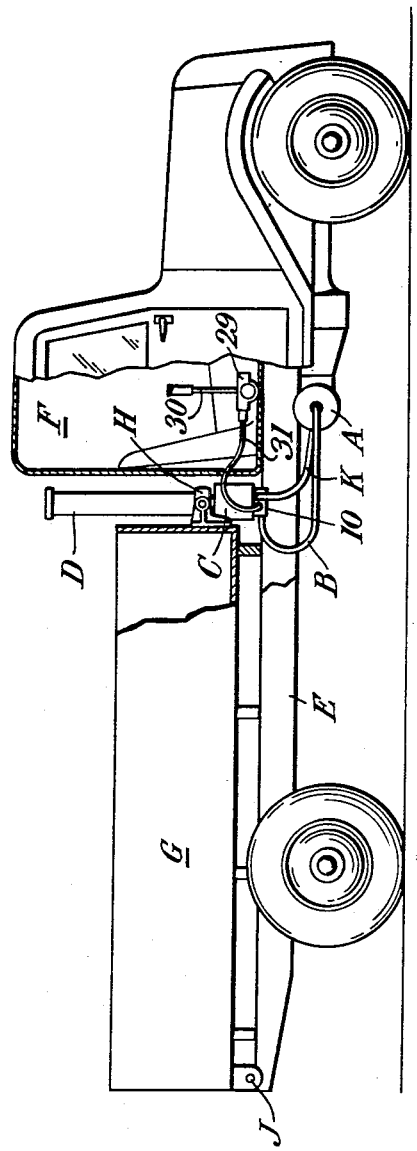

May 29, 1956  J. COSGROVE  2,747,550
CONTROL VALVES FOR HYDRAULIC TIPPING-HOISTS FOR VEHICLES
Filed April 24, 1953  5 Sheets-Sheet 1

INVENTOR
James Cosgrove
By Watson, Cole, Grindle
& Watson ATTORNEYS

May 29, 1956   J. COSGROVE   2,747,550
CONTROL VALVES FOR HYDRAULIC TIPPING-HOISTS FOR VEHICLES
Filed April 24, 1953   5 Sheets-Sheet 2

INVENTOR
James Cosgrove
By Watson, Cole, Grindle &
Watson ATTORNEYS

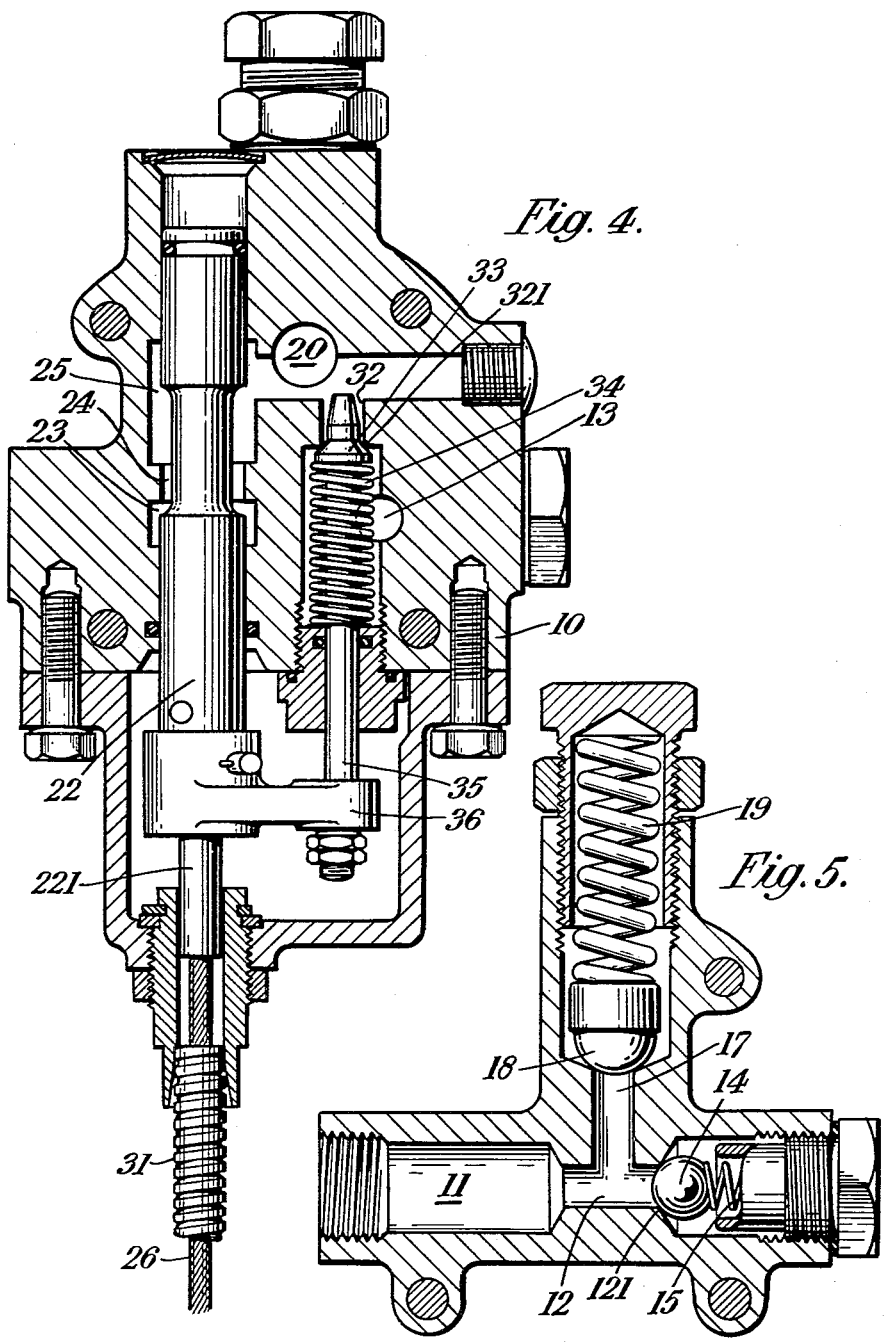

May 29, 1956  J. COSGROVE  2,747,550
CONTROL VALVES FOR HYDRAULIC TIPPING-HOISTS FOR VEHICLES
Filed April 24, 1953  5 Sheets-Sheet 5
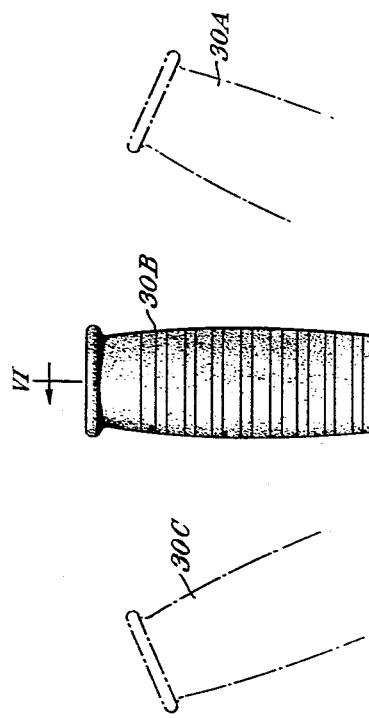
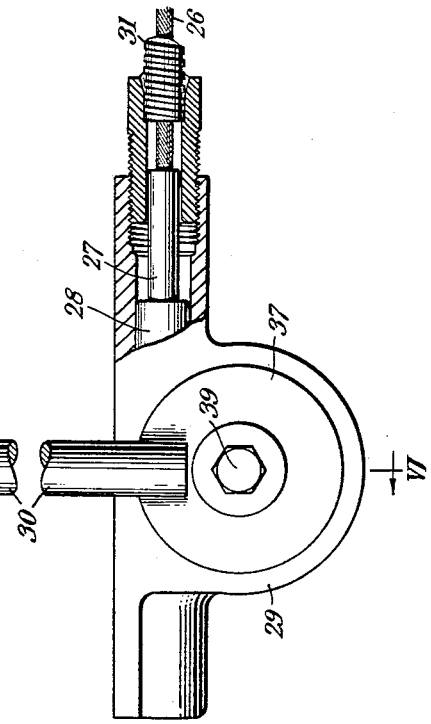
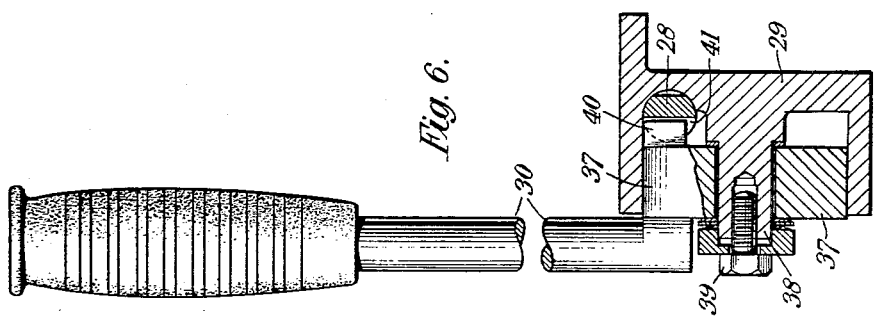
INVENTOR
James Cosgrove
By Watson, Cole, Grindle & Watson
ATTORNEYS United States Patent Office 2,747,550
Patented May 29, 1956

2,747,550

CONTROL VALVES FOR HYDRAULIC TIPPING-HOISTS FOR VEHICLES

James Cosgrove, Bolton, England, assignor to Edwards Brothers (Tippers) Limited, Bolton, England Application April 24, 1953, Serial No. 350,993

Claims priority, application Great Britain May 2, 1952

2 Claims. (Cl. 121—46.4)

The invention is concerned with the control valves provided for regulating the operation of hydraulic tipping-hoists for vehicle bodies.

It has hitherto been proposed, in connection with hydraulic tipping-hoists of the kind which are energised by a pump driven by a power take-off located on the chassis of the vehicle, to mount the control valve in a position adjacent to the pump so that it may be actuated by a lever projecting into the cab, or otherwise accessible to the driver without necessitating his leaving the cab, and in some cases a safety overload valve has been incorporated in the control valve assembly. While such an arrangement possesses certain advantages, it necessarily involves the provision between the remotely separated valve assembly and the ram assembly of pipe connections which are vulnerable to damage in use and the fracture of which entails serious risk of accident due to the collapse of a tipped load.

With the object of providing an improved control valve assembly and means for actuating the same in a hydraulic tipping-hoist of the aforesaid kind, the present invention proposes that such valve shall be incorporated in the ram assembly, and that the valve shall be actuable from the vehicle cab, or other convenient remote position, through the medium of a Bowden cable, flexible shaft or other suitable flexible mechanical connection.

Said valve preferably forms part of an assembly including an overload valve and, as a further feature of the invention it may be modified to provide three alternative settings respectively adapted (a) for the purpose of executing a tipping operation to direct fluid to the ram when the pump is in operation, (b) for the purpose of lowering a tipped body to release fluid from the ram, and (c) for the purpose of sustaining a body in a tipped position under load, e. g. to execute a spreading operation, to trap the fluid in the ram and to maintain the body in a predetermined tipped position without the necessity for de-clutching the power take-off and pump, both of which may be allowed to continue running until the spreading operation is complete.

The manner in which the invention may be carried into effect is hereinafter described with reference to its embodiment in a tipping-hoist as exemplified in British patent specification No. 426,005, in which the ram assembly is mounted on a base-plate within an enclosed tank disposed transversely the vehicle and carried at its opposite ends by trunnions rockably supported on the longitudinal chassis-members. Such tank constitutes a sump for the supply of working liquid to the pump and for the reception of liquid expelled from the ram cylinder or cylinders when the working pressure thereto is released. Hitherto it has been customary to mount the control valve at a remote position, frequently in the driver's cab, and to provide pipe-line connections between it and the ram assembly base-plate which is suitably bored to afford an appropriate inlet to the ram and the necessary outlet therefrom.

Figure 2:
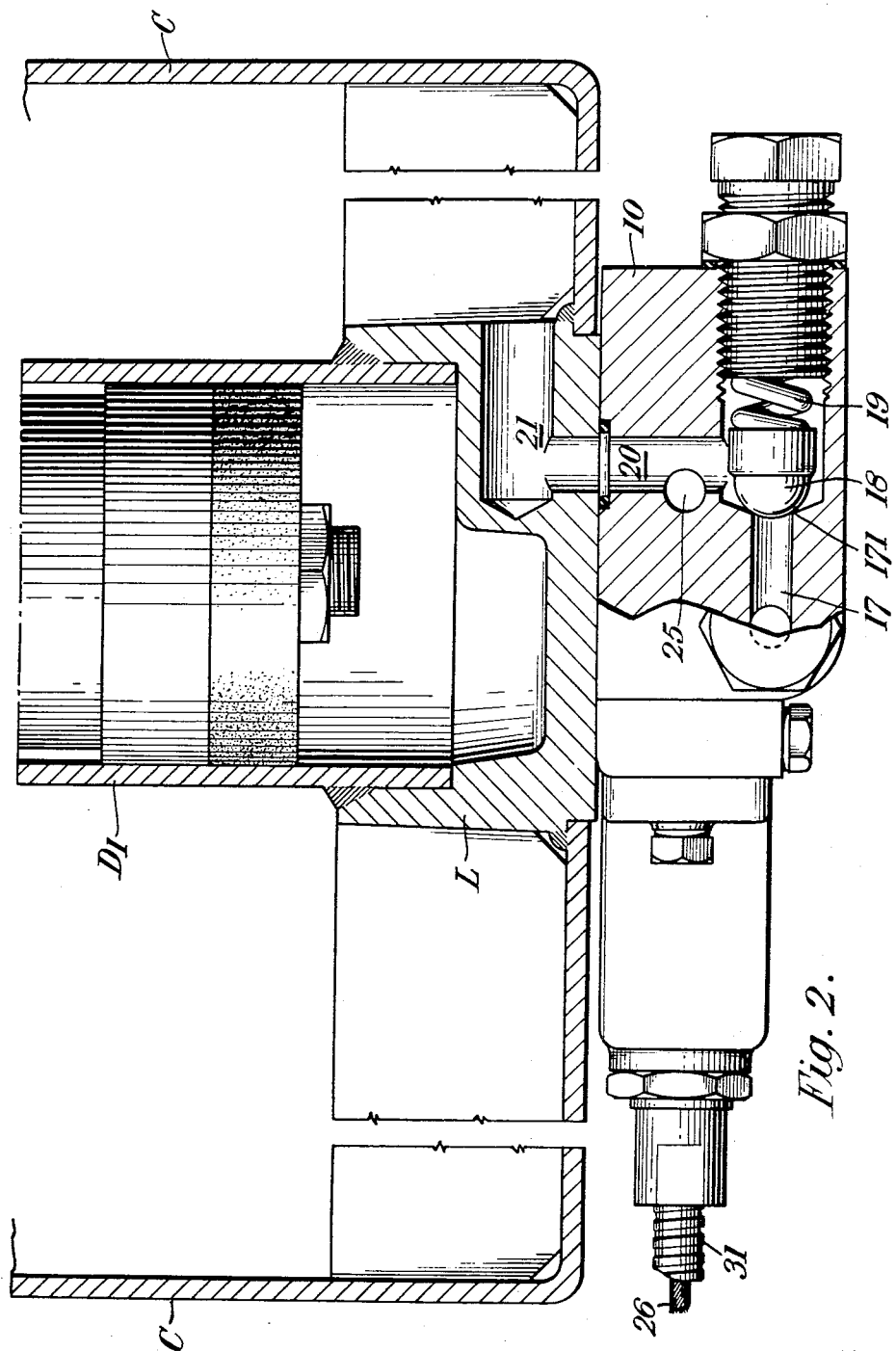
Figure 3:
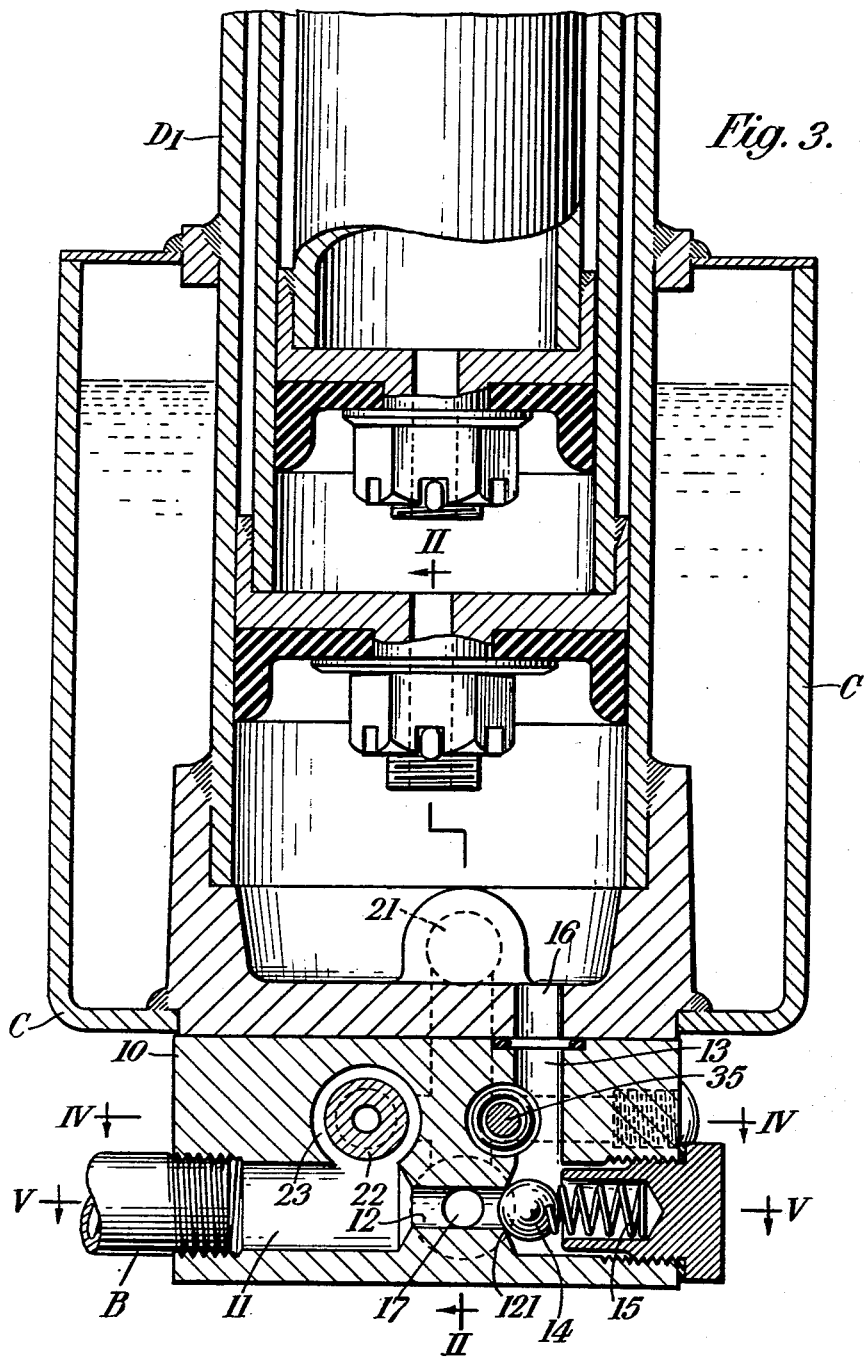

This embodiment is illustrated in the accompanying drawings, in which Fig. 1 is a side elevation of a tipping vehicle embodying the invention, Fig. 2 is a longitudinal section, taken on the line II—II of Fig 3, of the lower part of the tank and valve assembly, Fig. 3 is a transverse section thereof, Figs. 4 and 5 are details in section taken respectively on the lines IV—IV and V—V of Fig. 3, Figs. 6 and 7 are partly sectional details showing the valve control lever inside and front elevation, respectively.

Referring to the drawings, A indicates the pump by which fluid under pressure is supplied by a pipe B to the tank C of the ram assembly D, which latter is mounted to the rear of the vehicle with capability of rocking about trunnions (not shown) mounted on the longitudinal chassis-members E. The driver's cab is shown at F and the tilting body G is carried at the front end by a collar H which is attached to the cylinder of the outermost ram and at the rear end by pivots J. The pump A draws fluid from a reservoir in the tank C through a pipe K. The ram assembly D (of which the basal ram cylinder is indicated in Figs. 2 and 3 at $D_1$) is mounted upon a base-plate L which is incorporated in the base of the tank C.

On the underside of said base-plate L, where it protrudes through the base of the tank C, is mounted the body 10 of a control valve unit to an inlet passage 11 of which the pipe B is connected. A duct 12 leading from the passage 11 into a passage 13 is controlled by a ball-valve 14 which is urged by a compression spring 15 against a seating 121; the end of the passage 13 communicates with a port 16 in the base-plate L so that when the valve 14 is open the feed pipe 13 is in through communication with the interior of the ram cylinder $D_1$. Also connected to the duct 12 is a branch 17 the end of which is controlled by a ball-valve 18 urged by a compression spring 19 against the seating 171. When the valve 18 is moved from said seating connection is established between the branch 17 and a discharge duct 20 which communicates with a discharge port 21 in the base-plate L leading into the reservoir.

The pressure of the spring 19 closing the valve 18 is of a predetermined value in excess of that normally required to operate the rams under load, and the arrangement provides an overload safety device whereby in the event of the working pressure in the system exceeding said predetermined safe value, the fluid will be discharged directly from the duct 12 into the reservoir via the port 21.

A piston valve 22 slidably mounted in the valve unit body 10 (Fig. 4) controls a passage 23 leading from the inlet port 11 past an orifice 24 into a chamber 25 which is in communication with the discharge duct 20. Said valve 22 is extended at 221 where it is connected to a Bowden push-pull cable 26, the other end of which is attached at 27 to a plunger 28 which is slidably mounted in a bracket 29 situated in the driver's cab F and which is adapted to be actuated in the manner hereinafter described by an operating lever 30. The flexible outer sheath of the Bowden cable 26 is indicated at 31.

Direct communication between the discharge duct 20 and the passage 13 may also be established through an orifice 32 when a needle-valve 33, normally urged by a spring 34 to close said valve against a seating 321, is retracted therefrom. Said valve 33 is provided with a rod 35 upon which an apertured arm 36, attached to the valve-member 22, is adapted to slide, the arrangement being such that when the valve 22 is drawn downwardly as seen in Fig. 4 the arm 36 pulls the valve-rod 35 against the pressure of the spring 34 and opens the valve 33.

Referring now to Figs. 6 and 7, it will be seen that the operating lever 30 is attached to a wheel 37 which is revolubly mounted on a cylindrical off-set 38 of the bracket 29, being retained thereon by a screw-and-washer assembly 39. A lug 40 projecting rearwardly from the wheel 37 engages a slot 41 in the adjacent face of the slidable rod 28, and the arrangement is such that angular movement of the lever 30 produces a rectilinear movement of the rod 28 and push-pull cable 26.

To admit pressure fluid to the ram assembly D for the purpose of tipping the body G, the pump A being in operation, the operating lever 30 is moved to the position indicated at 30A in Fig. 7, pushing the cable 26 through its sheath 31 so that the valve-member 22 is slidden into the position in which the land thereof closes the orifice 24. In this condition, the pressure of the fluid from the pump, entering the inlet passage 11, overcomes the pressure of the valve-spring 15, raising the ball 14 from its seating 121, and enters the ram cylinder via the passage 13 and port 16.

When the body G has been tipped through the desired angle, it may be retained in that position by moving the lever 30 to the mid-position 30B. The valve 22 now assumes the position shown in Fig. 4, and the orifice 24 being open, fluid in the passage 23, orifice 24, chamber 25, discharge duct 20 and port 21 to the reservoir tank without affecting the ram assembly, the fluid in the latter being trapped because the valves 14 and 33 are both closed. Thus, the rams are locked hydraulically. This arrangement is advantageous in that it dispenses with the necessity for putting the pump out of action.

To lower the body G the operating lever 30 is moved to the position indicated at 30C. The resultant pull in the cable 26 is effective to unseat the valve 33 through the medium of the arm 36, and fluid in the ram cylinders is now permitted to discharge into the tank through the port 16, passage 13, orifice 32, chamber 25, duct 20 and port 21.

The provision of the arrangement whereby the ram assembly may be locked hydraulically in the raised position of the body G provides the facility that the vehicle may be employed for spreading material across the ground surface, the vehicle being driven forwards while the material is gradually discharged at the rear. If desired, a spreading attachment may be furnished, for discharging loose material in an even layer. It is also of considerable advantage that all the control operations can be performed by the driver without leaving his cab.

Further, it will be seen that the present arrangement minimizes the vulnerability of pipe connections between the ram assembly and the apparatus associated therewith, while retaining the important security offered by the non-return overload valve 18 against a sudden collapse of a tipped load in the event of an accident involving the hydraulic mechanism or other parts of the hoist. It will be understood that the term "driver's cab" is used herein to denote the position at which the driver of the vehicle is situated, whether or not such position is enclosed.

What I claim as my invention and desire to secure by Letters Patent is:

1. A hydraulic control valve for a fluid pressure operated member having a cylinder, comprising a casing, an inlet port in said casing, a source of fluid under pressure communicating with said port, a feed duct connecting said port to said cylinder through which the fluid moves to actuate said member, a check valve in said feed duct urged to seated position and adapted to unseat under the force of said fluid, a reservoir, an overload conduit connecting said feed duct to said reservoir, a check valve in said overload conduit normally closing the same and adapted to open should the pressure exceed a predetermined maximum, a by-pass duct branching from said feed duct and communicating with said reservoir, a piston valve movable longitudinally from a first position closing said by-pass duct to a second position opening said duct to a third position at which said duct is still open, an exhaust duct communicating between said cylinder and said reservoir, a needle valve normally urged to a position closing said exhaust duct, a connection between said piston valve and said needle valve whereby movement of said piston valve to said third position moves said needle valve to open said by-pass duct, reverse movement of said piston valve being independent of said needle valve, and means for moving said piston valve.

2. A hydraulic control vavle for a fluid pressure operated member having a cylinder comprising a casing, an inlet port in said casing, a source of fluid under pressure communicating with said port, a supply passageway connecting with said inlet port and extending to the cylinder of said member, a constriction in said passageway, a ball check valve in said passageway on the cylinder side of said constriction and adapted to normally seat against said constriction to close said passageway, a fluid reservoir, a constricted duct opening at one end into the constricted portion of said passageway, an enlarged chamber at the other end of said constricted duct, a relief passageway connecting said chamber to said reservoir, a ball check valve in said chamber normally closing off said constricted duct from said reservoir and adapted to unseat when the pressure exceeds a predetermined maximum, a cylindrical chamber opening at one end off said supply passageway, an intermediate portion of said chamber being of reduced cross-section, a piston valve of a diameter substantially equal to that of the reduced section of said chamber sliding axially in said chamber, said piston having a section of reduced diameter and being movable from a first position in which a large section fits in the reduced chamber portion to close off the chamber to second and third positions in which the small section fits in the reduced portion to permit flow therethrough, the other end of said chamber communicating with said relief passageway, an exhaust duct connecting the supply passageway between said check valve and said cylinder with said relief passageway, a needle valve normally closing off said exhaust duct, a connection between said piston valve and said needle valve whereby extended movement of said piston valve to said third position opens said needle valve, said piston valve being independently movable in a reverse direction, and manually operated means for moving said piston valve.

References Cited in the file of this patent

UNITED STATES PATENTS

| | | |
|---|---|---|
| 2,071,605 | Anthony et al. | Feb. 23, 1937 |
| 2,094,466 | Proctor | Sept. 28, 1937 |
| 2,226,192 | Barrett | Dec. 24, 1940 |
| 2,229,561 | Galanot | Jan. 21, 1941 |